(12) United States Patent
Schmucker et al.

(10) Patent No.: US 6,185,315 B1
(45) Date of Patent: Feb. 6, 2001

(54) METHOD OF COMBINING MULTIPLE SETS OF OVERLAPPING SURFACE-PROFILE INTERFEROMETRIC DATA TO PRODUCE A CONTINUOUS COMPOSITE MAP

(75) Inventors: Mark A. Schmucker; Brian W. Becker, both of Tucson, AZ (US)

(73) Assignee: Wyko Corporation, Tucson, AZ (US)

( * ) Notice: Under 35 U.S.C. 154(b), the term of this patent shall be extended for 0 days.

(21) Appl. No.: 09/153,365

(22) Filed: Sep. 15, 1998

Related U.S. Application Data

(63) Continuation of application No. 08/771,428, filed on Dec. 20, 1996, now Pat. No. 5,987,189.

(51) Int. Cl.[7] .................. G06K 9/00; G01B 9/02
(52) U.S. Cl. .................. 382/108; 356/345; 702/166
(58) Field of Search .................. 382/282, 283, 382/284, 154, 275, 286, 108, 168; 356/351, 357, 359, 376, 345; 702/166

(56) References Cited

U.S. PATENT DOCUMENTS

| | | | | |
|---|---|---|---|---|
| 4,641,972 | * | 2/1987 | Halioua et al. | 356/376 |
| 4,869,593 | | 9/1989 | Biegen | 356/351 |
| 5,469,259 | * | 11/1995 | Golby et al. | 356/351 |
| 5,471,303 | * | 11/1995 | Ai et al. | 356/357 |
| 5,555,471 | | 9/1996 | Xu et al. | 356/357 |
| 5,633,715 | * | 5/1997 | Ai et al. | 356/359 |
| 5,710,631 | | 1/1998 | Bou-Ghannam et al. | 356/351 |
| 5,712,890 | | 1/1998 | Spivey et al. | 378/37 |
| 5,717,782 | | 2/1998 | Denneau, Jr. | 382/154 |
| 5,726,754 | * | 3/1998 | Andrews et al. | 356/357 |
| 5,760,901 | * | 6/1998 | Hill | 356/345 |
| 5,784,163 | * | 7/1998 | Lu et al. | 356/351 |
| 5,831,736 | * | 11/1998 | Lichtman et al. | 356/376 |
| 5,926,266 | * | 11/1998 | Dorundo et al. | 356/237.2 |
| 6,011,624 | * | 1/2000 | De Groot | 356/355 |
| 6,011,625 | * | 1/2000 | Glass | 356/357 |
| 6,014,166 | * | 1/2000 | Guerra | 348/79 |

* cited by examiner

Primary Examiner—Bhavesh Mehta
Assistant Examiner—Kanji Patel
(74) Attorney, Agent, or Firm—Antonio R. Durando

(57) ABSTRACT

A method of combining height profiles of adjacent sections of a test surface to produce a composite profile of the surface consists of taking successive measurements of adjacent sections of the surface of the test sample by sequentially placing them within the field of view of the instrument and profiling them by phase shifting or vertical scanning. The x-y translation of the microscope between successive measurements from one section to the next adjacent section of the surface being profiled is carried out by overlapping such sections, so that spatial continuity is maintained between measurements. The height data generated for each section are then combined to form a larger image corresponding to the entire surface tested and discontinuities and/or errors introduced by the x-y translation process are corrected by normalizing the overlapping portions to a common reference plane. A plane is fitted through each set of measured heights in the overlapping regions and the tip, tilt and offset of each fitted plane are corrected to produce matching overlapping height data in adjacent sections. The measured height data for the balance of each section are then also corrected by the same difference in tip, tilt and offset to obtain a continuous normalized image.

10 Claims, 9 Drawing Sheets

FIT A PLANE EQUATION THROUGH THE MEASURED HEIGHTS IN SECTION 3 CORRESPONDING TO THE REGION OF OVERLAP WITH SECTION 2, $\underline{H}_{3,2}(x,y)$, TO OBTAIN A CURRENT PLANE EQUATION $$z_{3,2}(x,y) = a_{3,2} + b_{3,2}x + c_{3,2}y$$

FOR EACH PIXEL IN SECTION 3, CALCULATE A CORRECTED HEIGHT $h_3'(x,y) = h_3(x,y) + z_{2,3}(x,y) - z_{3,2}(x,y)$

REPEAT THE LAST THREE STEPS FOR ALL THE SECTIONS IN THE TEST AREA BY SEQUENTIALLY FITTING A PLANE EQUATION THROUGH THE CORRECTED HEIGHTS IN SECTION n CORRESPONDING TO THE REGION OF OVERLAP WITH SECTION n+1, $\underline{H}'_{n,n+1}(x,y)$,

TO OBTAIN A CURRENT REFERENCE PLANE EQUATION $$z_{n,n+1}(x,y) = a_{n,n+1} + b_{n,n+1}x + c_{n,n+1}y,$$

FITTING A PLANE EQUATION THROUGH THE MEASURED HEIGHTS IN SECTION n+1 CORRESPONDING TO THE REGION OF OVERLAP WITH SECTION n, $\underline{H}_{n+1,n}(x,y)$,

TO OBTAIN A CURRENT CORRECTION PLANE EQUATION $$z_{n+1,n}(x,y) = a_{n+1,n} + b_{n+1,n}x + c_{n+1,n}y,$$

AND CALCULATING A CORRECTED HEIGHT $$h'_{n+1}(x,y) = h_{n+1}(x,y) + z_{n,n+1}(x,y) - z_{n+1,n}(x,y)$$

FOR EACH PIXEL IN SECTION n+1, AND FOR ALL n, $3 \leq n \leq t-1$

FIG. 3B

METHOD OF COMBINING MULTIPLE SETS OF OVERLAPPING SURFACE-PROFILE INTERFEROMETRIC DATA TO PRODUCE A CONTINUOUS COMPOSITE MAP

CROSS REFERENCES TO RELATED APPLICATIONS

This application is a continuing application of Ser. No. 08/771,428, filed on Dec. 20, 1996, now U.S. Pat. No. 5,987,189.

BACKGROUND OF THE INVENTION

1. Field of the Invention

This invention pertains to the general field of interferometric profilometry. In particular, it provides a technique for improving the resolution of an interferometric profilometer by reducing the field of view of its objective and combining multiple overlapping images to form a composite profile.

2. Description of the Prior Art

The optical resolution of the objective of an interferometer is an important parameter in the overall performance of the instrument. The spatial resolution can be enhanced by reducing the field of view of the objective, but that also reduces the capability of the instrument with respect to the area of sample being tested. If, on the other hand, the field of view is enlarged to cover a larger test surface, the optical (and therefore also spatial) resolution of the resulting image is adversely affected. Therefore, a practical balance is normally struck between the optical resolution of the profilometer and the size of the test surface that it can handle.

As interferometric technology progresses, it has become very desirable to provide some flexibility with regard to the surface size of the samples suitable for testing. This invention provides a procedure for enhancing the resolution or, alternatively, for increasing the x-y profiling range of a conventional interferometer.

BRIEF SUMMARY OF THE INVENTION

It is therefore an objective of this invention to provide a procedure that effectively increases the field of view of a given interferometric profiler without modifications to its optics.

Another object of the invention is a procedure for increasing the field of view of a given interferometric profiler without affecting its optical resolution.

Another objective of the invention is a computationally efficient method to achieve the above goals, so that computer processing time is minimized.

Another goal of the invention is a method that is computationally stable, repeatable and consistent with measured data.

A further objective of the invention is a procedure capable of implementation in real time for on-line applications.

Another goal of the invention is its general application to increasing the x-y scanning range of conventional interferometric profilers without limitation to any specific field of testing.

Finally, another goal is the realization of the above mentioned objectives in a system that can be implemented with existing sensory, computing, and other hardware devices.

In accordance with these and other objectives, the preferred embodiment of the method and apparatus of this invention consists of taking successive measurements of adjacent sections of the surface of a test sample by sequentially placing them within the field of view of the instrument and independently profiling each section by phase shifting or vertical scanning interferometry. The x-y translation of the microscope between successive measurements from one section to the next adjacent section of the surface being profiled is carried out by maintaining a region of overlap between sections, so that spatial continuity is retained between measurements. The height data generated for each section are then combined to form a larger image corresponding to the entire surface tested and discontinuities and/or errors introduced by the x-y translation process are corrected by normalizing the overlapping portions to a common reference plane. A plane is fitted through each set of measured heights in the overlapping regions and the tip, tilt and offset of one of the fitted planes are corrected to produce matching overlapping height data in adjacent sections. The measured height data for the balance of each section are then also corrected by the same difference in tip, tilt and offset to obtain a continuous normalized image.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DETAILED DESCRIPTION OF THE INVENTION

The method of this invention is directed at optimizing the meshing of overlapping height-profile data acquired by interferometric measurements carried out according to conventional procedures and apparatus. When multiple sets of data are acquired by profiling adjacent sections of the surface being profiled, the combination of such sets of data to form a larger composite image corresponding to the entire surface is complicated by the need for correction of misalignments and corresponding errors introduced during the x-y translation of the scanning mechanism in the interferometer. These misalignments result in height data sets based on different reference planes; therefore, the overlapping portions of adjacent sections do not normally produce consistent height data. This invention describes a process for normalizing the data to a common reference surface, such that the heights measured for overlapping portions of adjacent sections are equalized and all data sets may be combined to form an accurate composite profile.

It is noted that the embodiments of the present invention are described with reference to x, y and z orthogonal coordinates wherein x and y define a horizontal plane substantially parallel to the surface of the sample being tested and z defines a vertical direction of white-light (VSI) or phase-shifting (PSI) scanning, but it is obvious that the structure and operation of the features detailed herein could be rotated in any direction with equivalent results. Accordingly, reference to x-y translation corresponds to the very fine movement (on the order of several microns or millimeters, with control within less than 1 ηm) of the optics of the interferometer in the plane of the test surface to position the optics over the desired target area on the surface of the sample, which is a very exact operation that requires precision instrumentation and mechanisms.

According to conventional profiling methods, the section of surface being tested is subdivided into an array of pixels corresponding to detector cells in the sensory apparatus. Thus, an array of height data is generated wherein each data point represents the height of a small region or pixel of a two-dimensional target area. The data array constitutes a map of the height as measured at each pixel throughout the target area.

Figure 1:
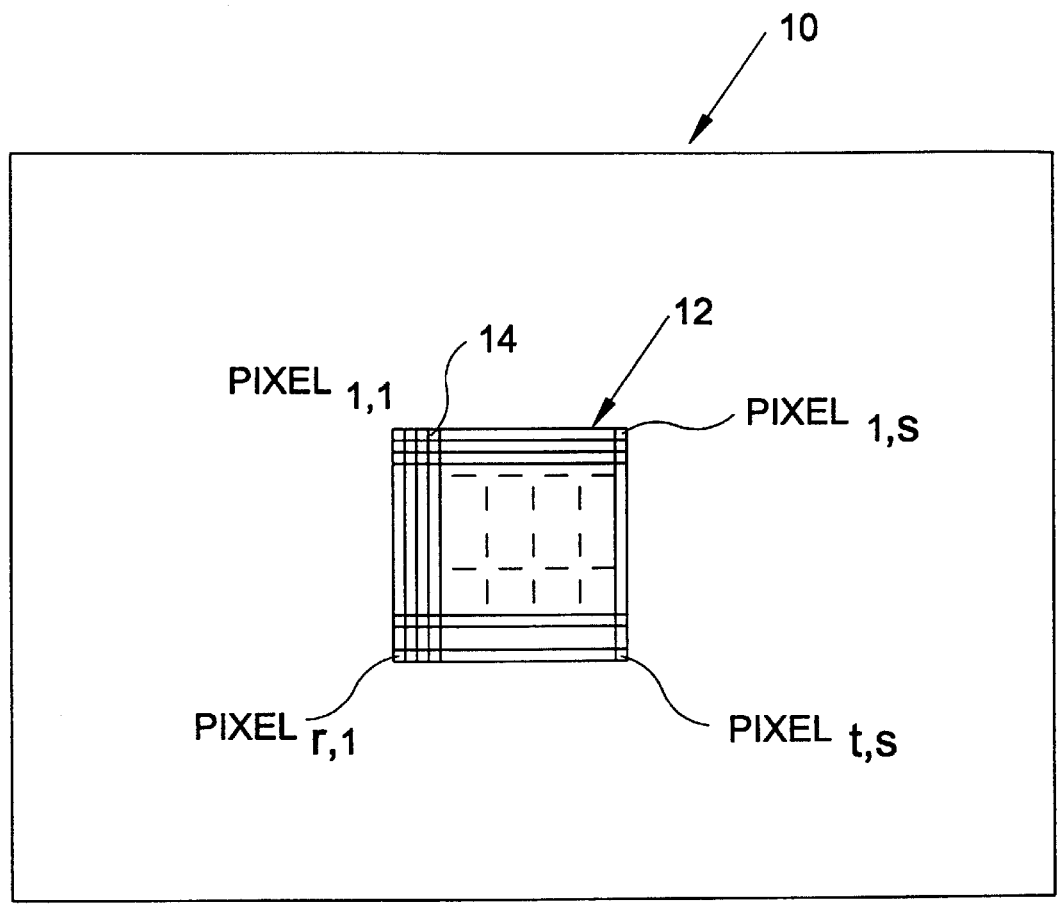
FIG. 1 illustrates in schematic view a test surface being measured by interferometric apparatus having an optical objective with a field of view smaller than the test surface, where the field of view is shown subdivided into rows and columns defining pixels corresponding to the cells of the light detector.
Figure 2:
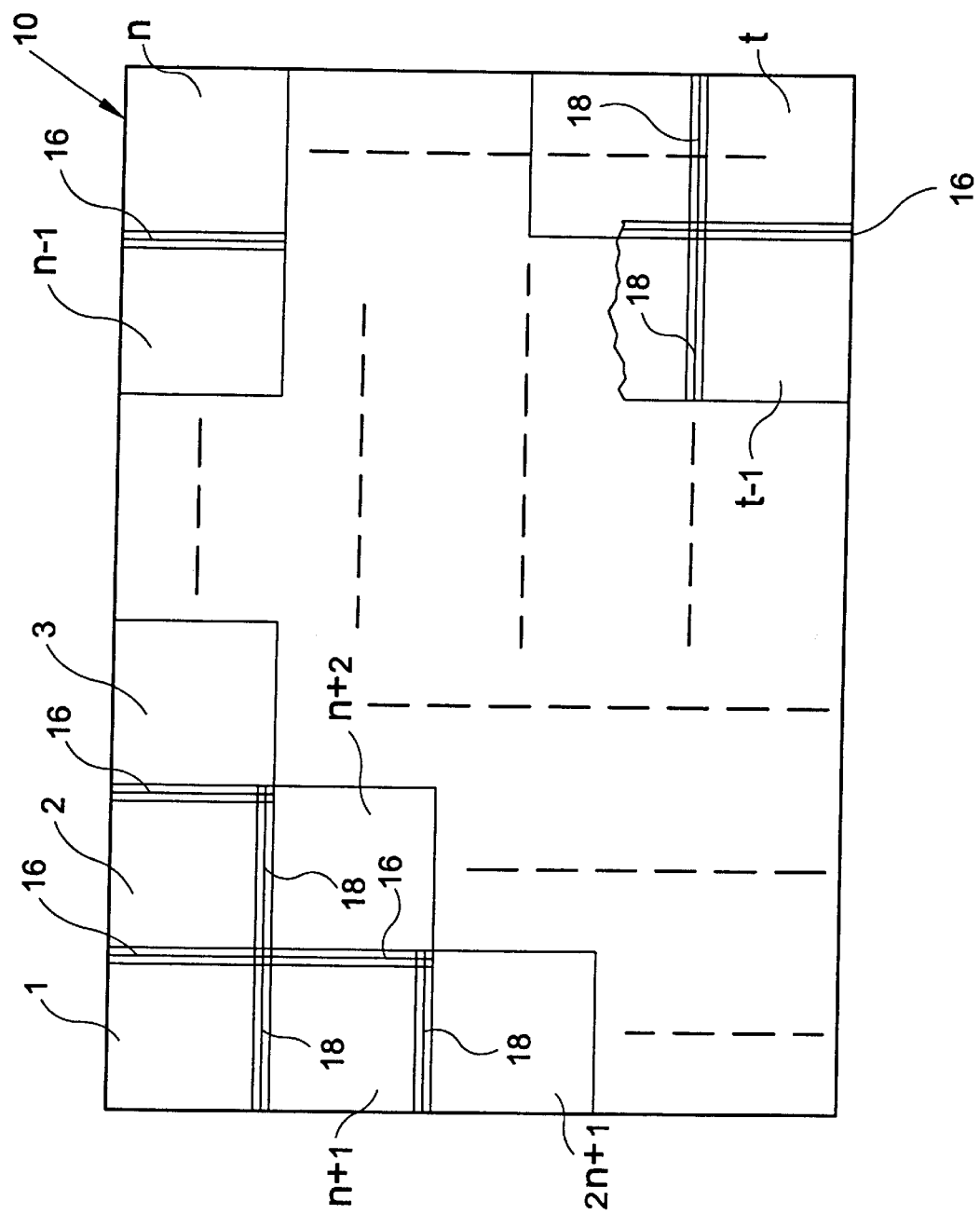
FIG. 2 illustrates the steps of the invention related to the x-y translation of the objective to measure multiple overlapping sections of the test surface.

According to a first aspect of the invention, the procedure requires that multiple sets of measurements be carried out, each set corresponding to a different target section on the surface of the test sample. Referring to the drawings, wherein like parts are designated throughout with like numerals and symbols, FIG. 1 illustrates in schematic view a test surface 10 being measured by interferometric apparatus having optics set with a field of view (smaller than the surface 10) equal to the area 12 subdivided into r rows and n columns (for example) of individual pixels 14. According to the method of the invention, the objective of the interferometer is positioned over a predetermined first section 1 of the surface 10 at known x-y coordinates, as illustrated in FIG. 2, and the section is scanned either by VSI or PSI to generate a first height map $H_1(x,y)=\{h_1(1,1), h_1(1,2), h_1(1,3), \ldots h_1(r,s)\}$ according to conventional interferometric procedures. It is noted that all such procedures involve the adjustment and measurement of the tip and tilt of the tested surface with respect to a predetermined reference plane, so that the measured height profile is relative to that plane.

The objective of the interferometer is then translated in the x-y plane to a different section 2 of known x-y coordinates. The new coordinates are selected to provide a region 16 of overlap with the first section 1. The overlap 16 is illustrated in FIG. 2 as at least two columns, but differently-shaped common regions would be equivalently suitable to practice the invention. As one skilled in the art would know, the particular geometry of the overlapping region would preferably depend on the arrangement of the pixels (normally an x-y array) in the light detecting apparatus. The critical consideration is that the region of overlap must be such as to provide sufficient data points to fit a plane equation through them. Section 2 is then scanned to generate a second height map $H_2(x,y)=\{h_2(1,1), h_2(1,2), h_2(1,3), \ldots h_2(r,s)\}$.

The procedure is repeated to cover the entire surface 10 intended for testing. At each x-y translation of the objective from one section to another, the new position is selected according to predetermined coordinates that ensure an overlap region with at least one adjacent section (such as two rows or two columns, as applicable; note that one row and one column with two adjacent sections would also suffice because of adequate data to fit a plane equation through them). The illustration of FIG. 2 shows row overlaps 18 as well as column overlaps 16, but the exact nature and extent of the overlaps is not critical to the invention, so long as the exact pixels (i.e., exact x-y coordinates) corresponding to overlapping regions between pairs of measured sections are exactly known (within a spatial tolerance deemed acceptable).

Thus, the procedure is carried out sequentially until multiple sets of height data are generated as required to cover the entire test surface 10. FIG. 2 shows t sets of measurements for illustration purposes. Accordingly, the example of FIG. 2 would produce t sets of height data $[H_1(x,y)$ through $H_t(x,y)]$.

The heart of the present invention concerns the process of normalizing and combining these height data to produce a smooth and accurate composite profile. Therefore, according to another aspect of the invention, the height data of overlapping regions of each pair of adjacent sections are fitted by conventional numerical methods (such as least squares) to produce plane functions representing each overlapping region. Considering sections n and n+1, for example, the height data in the overlapping region of section n [designated as $\underline{H}_{n,n+1}(x,y)$, where the underlined notation is used to indicate a region of overlap; the first subscript n denotes the section and overlap region being fitted; and the second subscript n+1 denotes the adjacent overlapping section] are used to produce a corresponding plane equation $f_{n,n+1}(x,y)=z_{n,n+1}=a_{n,n+1}+b_{n,n+1}x+c_{n,n+1}y$, where a, b and c are the coefficients of the plane equation. Similarly, the overlapping region data of section n+1, $\underline{H}_{n+1,n}(x,y)$, are used to produce the plane equation $f_{n+1,n}(x,y)=z_{n+1,n}=a_{n+1,n}+b_{n+1,n}x+c_{n+1,n}y$. Based on the equations so derived, the tip, tilt and offset of the plane n+1 with respect to plane n (or viceversa, if preferred) can be calculated and used to mesh the two overlapping regions into a single plane.

As one skilled in the art would readily recognize, the equation coefficients b and c of the plane equations are a measure of tip and tilt, respectively, and the difference in the c coefficient is a measure of the vertical offset between planes. Therefore, these calculated coefficients provide a readily available tool for calculating tip and tilt differences and offsets between overlapping equations and for meshing overlapping regions of adjacent sections.

The preferred procedure involves selecting a section of the tested surface 10 as the reference plane for normalization and fitting a plane equation to the height data of its region overlapping an adjacent section [for example, $z_{1,2}(x,y)=a_{1,2}+b_{1,2}x+c_{1,2}y$, corresponding to a plane equation fitted through the section-1 region of data overlapping section 2]. Then the measured height data in the overlapping region of adjacent section 2 are also fitted to produce a corresponding plane equation $z_{2,1}(x,y)=a_{2,1}+b_{2,1}x+c_{2,1}y$. The differences in tip, tilt and vertical elevation between these two plane equations are calculated and used to produce matching plane equations with uniform tip and tilt and with no offset.

Assuming, for example, that $b_{1,2}=0.04'$ of a degree and $b_{2,1}=0.03'$, the difference $(0.03-0.4=-0.01)$ between the coefficients of the section-2 equation and the section-1 equation (the reference plane) would be subtracted from $b_{2,1}$ to produce the same tip for the latter equation $[0.03-(-0.01)=0.04]$. Similarly, assuming, for example, that $c_{1,2}=0.01'$ and $c_{2,1}=0.02'$, the difference $(0.02-0.01=+0.01)$ would be subtracted from $c_{2,1}$ to produce the same tilt $(0.02-0.01=0.01)$. Finally, any vertical offset between the two planes (typically this offset is called "piston" in the art) is eliminated by reducing the a coefficient to the same value. Assuming, for example, that $a_{1,2}=10$ nm and $a_{2,1}=7$ nm, the piston $(7-10=-3)$ would be subtracted from $a_{2,1}$ to produce the same a coefficient of 10 $[7-(-3)=10]$.

For purposes of notation, the prime symbol "'" is used herein to denote corrected quantities. Accordingly, once the functionality of the plane equation for section 2 overlapping section 1 has been so adjusted to produce a corrected plane equation $z'_{2,1}(x,y)$, each value of measured height data for section 2, $H_2(x,y)=\{h_2(1,1), h_2(1,2), h_2(1,3), \ldots h_2(r,s)\}$, is also adjusted to yield new corrected height values $H'_2(x,y)$ that reflect the adjustment to the tip, tilt and piston that caused the two plane equations fitted through the overlap region to mesh into a common plane. In essence, this step in the procedure generates a new set of height data $H'_2(x,y)$, $1 \leq x \leq r$ and $1 \leq y \leq s$, which consists of corrected height values that account for the difference in tip, tilt and vertical elevation produced by the x-y translation of the interferometer's objective between sections 1 and 2. The step can be carried out by extending the fitted and corrected plane equations to the entire section 2 and by calculating a correction factor, $\Delta h_{2,1}(x,y)=z_{2,1}'(x,y)-z_{2,1}(x,y)$, for each pixel in section 2. Each measured height value in section 2 is then corrected by adding the corresponding factor to the measured datum; i.e., $h_2'(x,y)=h_2(x,y)+\Delta h_{2,1}(x,y)$ for all x and y coordinates in section 2.

The next step of the process consists of a repetition of the procedure for the next overlapping regions in the sequence of tested sections (i.e., the region of overlap between sections 2 and 3 in the example). The corrected height values for section 2, $H_2'(x,y)$, are used as reference with respect to section 3 and the heights of the overlapping region in section 3 are corrected to mesh with the corrected heights obtained for the same region of section 2 during the first correction step. Accordingly, a plane equation $z_{2,3}(x,y)=a_{2,3}+b_{2,3}x+c_{2,3}y$ is fitted through the corrected height data $H_{2,3}'(x,y)$ in the region of overlap with section 3. Similarly, the measured height data in the overlapping region of the adjacent section 3 are also fitted to produce a corresponding plane equation $z_{3,2}(x,y)=a_{3,2}+b_{3,2}x+c_{3,2}y$ and the differences in tip, tilt and vertical elevation between these two plane equations are used to correct the latter to match the former. Finally, correction factors, $\Delta h_{3,2}(x,y)=z_{3,2}'(x,y)-z_{2,3}(x,y)$, are calculated for all pixels in section 3 and each measured height value in section 3 is corrected by adding the corresponding factor to the measured value; i.e., $h_3'(x,y)=h_3(x,y)+\Delta h_{3,2}(x,y)$ for all x and y coordinates in section 3.

By repeating this process sequentially for each pair of adjacent sections, all overlapping regions are brought substantially together and a map of continuous height data is progressively generated. Thus, referring again to the example of FIG. 2, $H_{4,3}(x,y)$ is corrected to mesh with $H_{3,4}'(x,y)$, $H_{5,4}(x,y)$ with H4,5'(x,y), etc., always taking the last corrected height data as the reference for correcting the next adjacent section, until all overlapping regions of all sections are meshed together. When a section overlaps with more than one previously corrected section (such as, for example, the section denoted as n+2 in FIG. 2, which overlaps with sections 1, 2, 3 and n+1), the reference plane is preferably obtained by treating all overlap areas as a single region and fitting a plane equation through all corrected data in that region (i.e., 1, 2, 3 and n+1 in the example).

Figure 3A:
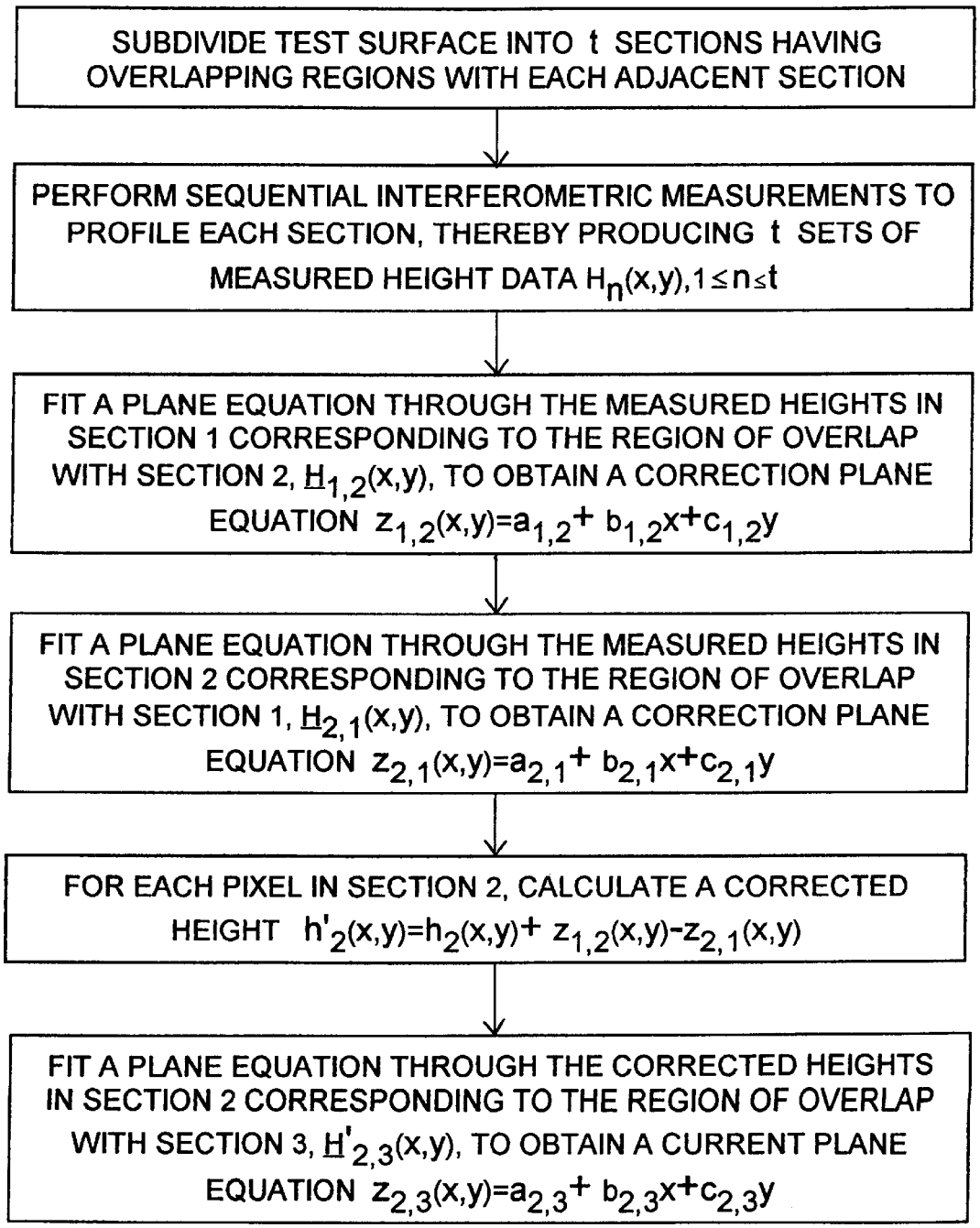
FIG. 3 is a block diagram of the process of the invention.

It is noted that in practice the procedure is much simplified by the fact that each corrected plane equation $H_{n+1,n}'(x,y)$, $1 \leq n \leq t-1$, in fact corresponds to the reference plane equation $H_{n,n+1}(x,y)$ from which it was derived. Therefore, there is no need for calculating and applying correction factors at each overlap region. Once the corrected heights of section n in an overlapping region between sections n and $n+1[H_{n,n+1}'(x,y)]$ are fitted to yield a current reference plane equation $z_{n,n+1}(x,y)$, and the overlapping measured data in section n+1 are fitted to produce a corresponding plane equation $z_{n+1,n}(x,y)$, the corrected plane equation for section n+1 is obtained simply by setting it equal to the current reference plane equation; i.e., $z_{n+1,n}'(x,y)=z_{n,n+1}((x,y)$. Thus, each measured height in section n+1 is corrected by a factor equal to the difference between the two equations at the corresponding pixel, as follows:

$$h_{n+1}'(x,y)=h_{n+1}(x,y)+[z_{n,n+1}(x,y)-z_{n+1,n}(x,y)],$$

for all x and y coordinates in section n+1. FIG. 3 is a block diagram illustrating the general steps of the procedure of the invention.

Figure 4:
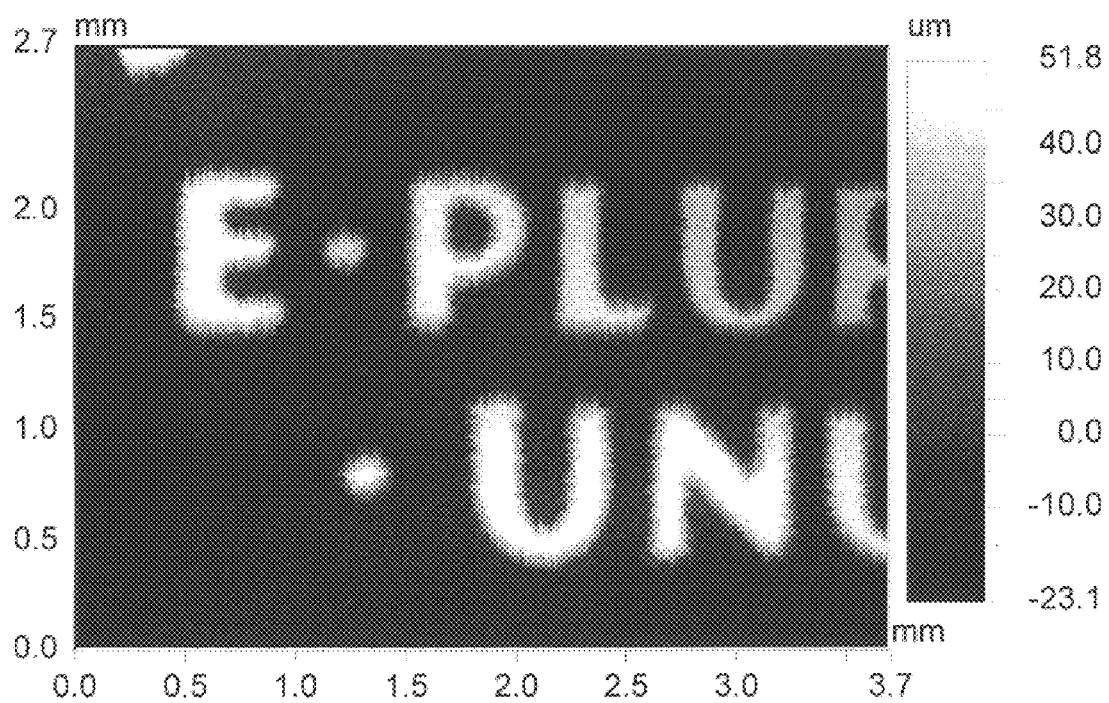
FIG. 4 is a first VSI measurement taken with a field of view corresponding to a magnification of 1.5×, with a pixel spacing of 5.60 μm, of the first half of the pattern (E PLUR UNU) on a coin.
Figure 5:
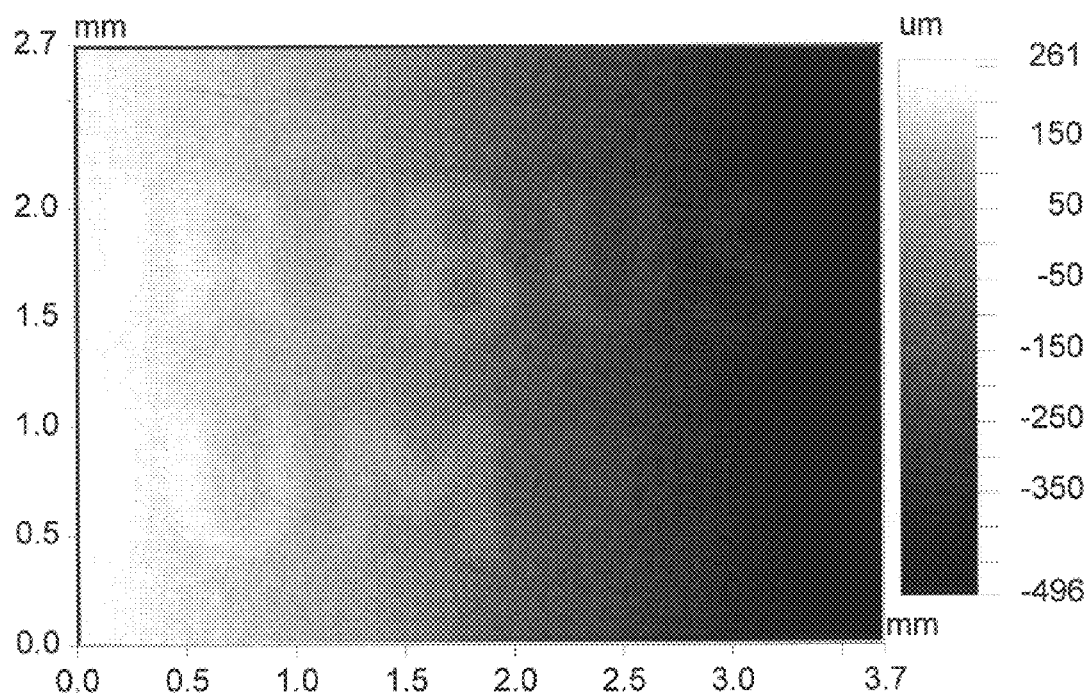
FIG. 5 is a second measurement taken with a field of view corresponding to a magnification of 1.5×, with a pixel spacing of 5.60 μm, of the second half of the pattern (URIBUS NUM), where a predetermined tilt is introduced so that the two measurements do not fall into the same plane.
Figure 6:
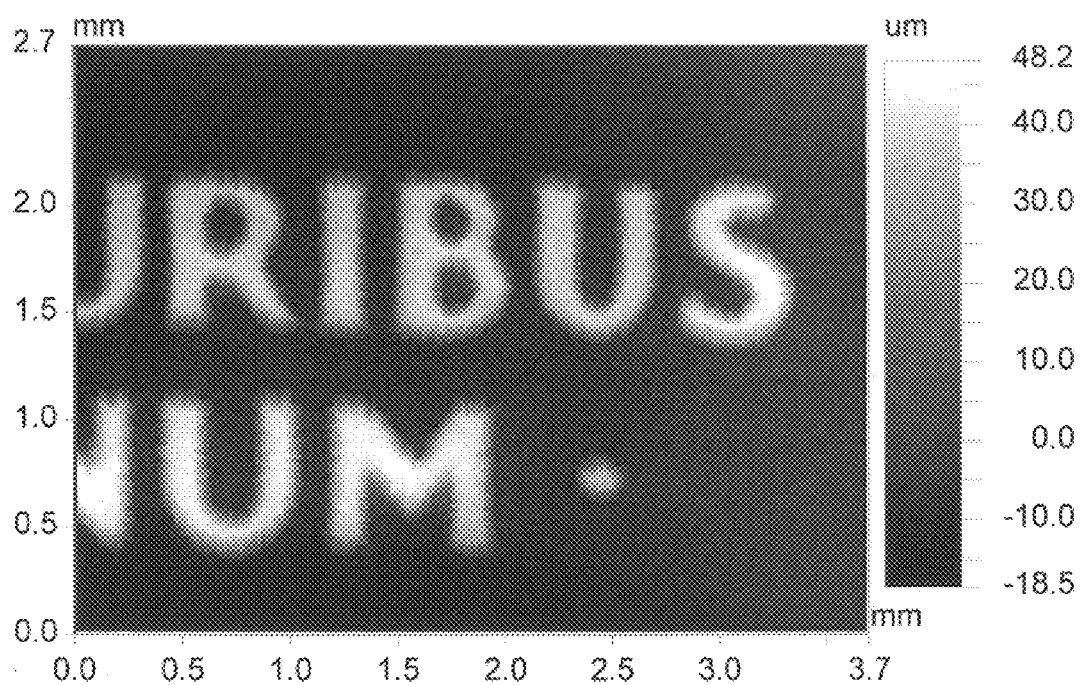
FIG. 6 is another measurement of the region of FIG. 5, but with the tilt removed, thereby approximating the tilt plane of the first measurement (FIG. 4) and the profile expected for this region after the corrections provided by the invention.
Figure 7:
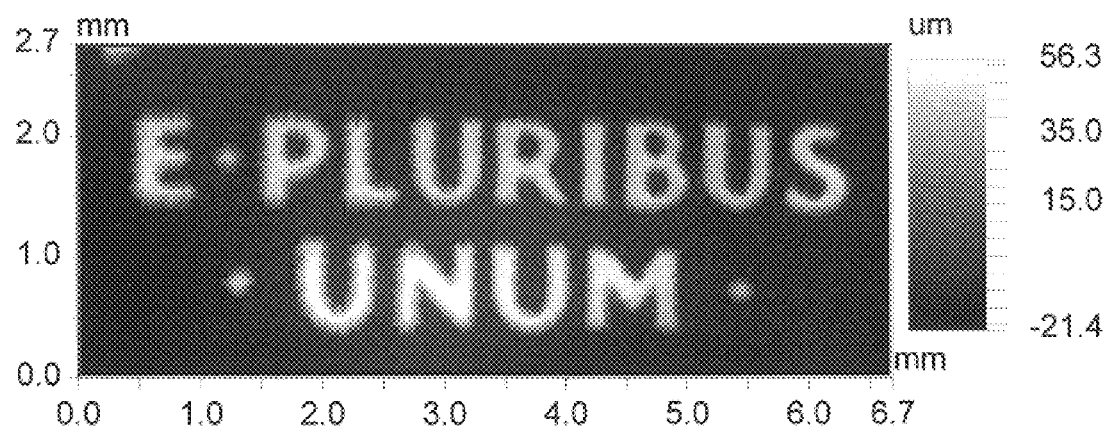
FIG. 7 is a composite profile obtained combining the data from the first and second measurements (FIGS. 4 and 5) according to the invention.

The method of the invention produces smooth images of the entire surface area 10 with the same resolution afforded by the objective of the interferometer within the smaller field of view 12. FIGS. 4–7 illustrate the results obtained by combining two height data sets of a coin according to the method of the invention, using the words "E PLURIBUS UNUM" as a recognizable feature extending over the field of view of the interferometer. FIG. 4 is a VSI measurement of the first half of the pattern (E PLUR UNU) taken with a field of view corresponding to a magnification of 1.5×, and a pixel spacing of 5.60 μm. FIG. 5 is a second measurement at 1.5× magnification, with a pixel spacing of 5.60 μm, of the second half of the pattern (URIBUS NUM), where a predetermined tilt is introduced so that the two measurements do not fall into the same plane. This figure shows the error produced by such a tilt. FIG. 6 is the same measurement of the region of FIG. 5, but with the tilt removed, thereby approximating the tilt plane of the first measurement and the profile expected for this region after the corrections provided by the invention. FIG. 6 is provided for visual reference only, to illustrate what the procedure should do to minimize tilt differences in the two measurements. FIG. 7 is a composite profile obtained combining the data from the first and second measurements according to the invention. Notice that the procedure effectively increased the field of view in the x direction by approximately 80% (from 3.7 μm to 6.7 μm), while maintaining a pixel spacing of 5.60 μm, thus preserving the original lateral resolution.

Figure 8:
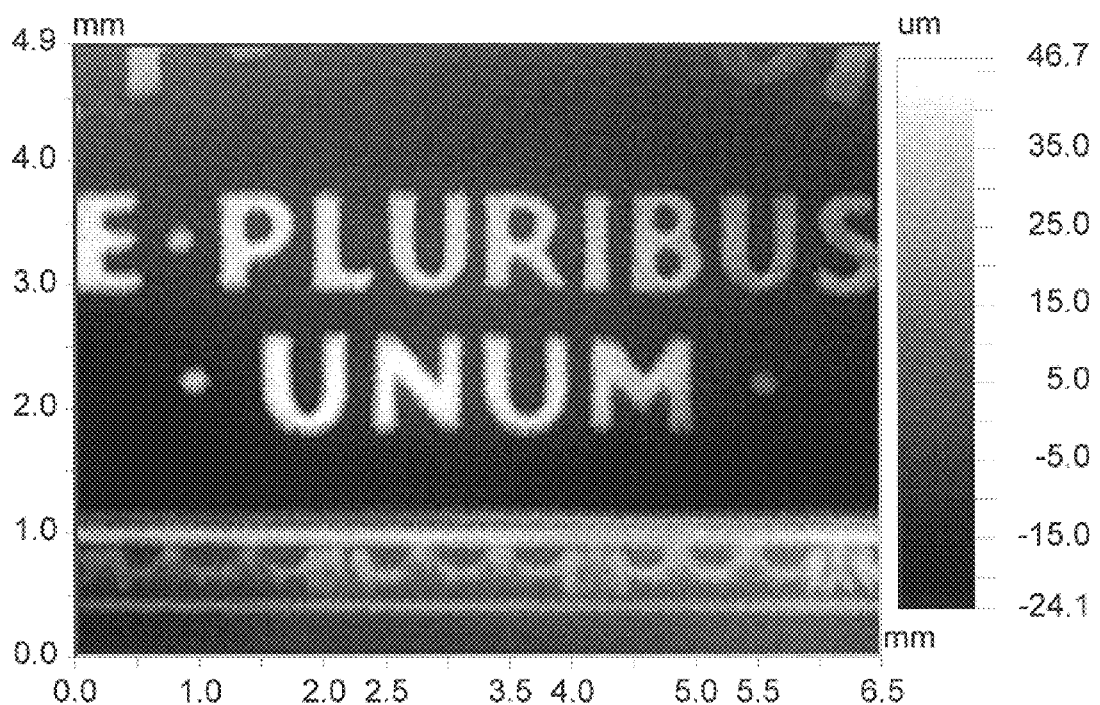
FIG. 8 is a profile corresponding to the coin of FIG. 7, but taken with a larger field of view, sufficient to span the entire image without a necessity for x-y translation.

FIG. 8 is a profile corresponding to the coin of FIG. 7, but taken with a larger field of view sufficient to span the entire image without x-y translation. This figure illustrates the loss of resolution attendant to this approach, as compared to the meshing approach of the invention.

It is clear that the system and method so described could be obviously modified by those skilled in the art to include refinements that have been ignored in this disclosure. For example, as mentioned above, the definition of an adjacent pixel could be modified to reflect different pixel arrangements and/or geometries of the light detector. These modifications would produce equivalent methods that would require corresponding adjustments in the computer program utilized to implement them. Thus, it is understood that many equivalent systems are possible within the scope of the present invention and that those skilled in the art could easily design a special system for a specific type of detector array and x-y translation system.

Therefore, various changes in the details and steps that have been described may be made by those skilled in the art within the principles and scope of the invention herein illustrated and defined in the appended claims. While the present invention has been shown and described herein in what is believed to be the most practical and preferred embodiment, it is recognized that departures can be made therefrom within the scope of the invention, which is not to be limited to the details disclosed herein, but is to be accorded the full scope of the claims so as to embrace any and all equivalent apparatus and methods.

We claim:

1. A method for using an interferometric profiler having an objective with a predetermined field of view to profile a test surface larger than said field of view, comprising the following steps:

(a) taking successive interferometric measurements of adjacent sections of the test surface by sequentially placing each section within the field of view of the objective and independently profiling each section to generate a corresponding height map; and (b) combining a plurality of height maps generated in step (a) and normalizing said height maps to a common reference plane to form a composite map corresponding to the test surface.

2. The method described in claim 1, wherein step (a) is carried out by maintaining a region of overlap between sections, so that spatial continuity is retained between measurements.

3. The method described in claim 1, wherein the test surface is stationary and between successive measurements step (a) is carried out by translation of the objective with respect to the test surface.

4. The method described in claim 1, wherein the objective is stationary and between successive measurements step (a) is carried out by translation of the test surface with reference to the objective.

5. The method described in claim 3, wherein step (a) is carried out by maintaining a region of overlap between sections, so that spatial continuity is retained between measurements.

6. The method described in claim 4, wherein step (a) is carried out by maintaining a region of overlap between sections, so that spatial continuity is retained between measurements.

7. The method described in claim 1, wherein each of said adjacent sections of the test surface consists of a predetermined area of the test surface having a fixed geometry and containing a set of pixels corresponding to measured heights.

8. The method described in claim 2, wherein each of said adjacent sections of the test surface comprises a substantially rectangular section of the test surface containing a set of pixels corresponding to a matrix of measured heights.

9. The method described in claim 8, wherein the normalization in step (b) is carried out by (c) positioning the objective over a predetermined initial section of the test surface and obtaining a measured height profile of said initial section by interferometric measurements;

(d) positioning the objective over a predetermined subsequent section of the test surface having a region of overlap with the initial section and obtaining a measured height profile of said subsequent section by interferometric measurements;

(e) positioning the objective over another predetermined subsequent section of the test surface having a region of overlap with any section previously measured and obtaining a measured height profile of said other predetermined subsequent section by interferometric measurements;

(f) repeating step (e) as required to cover a predetermined portion of the test surface by positioning the objective over a predetermined succeeding section of the test surface having a region of overlap with a preceding section of the test surface, and by obtaining a measured height profile of said succeeding section by interferometric measurements;

(g) selecting one of the sections with measured height profiles generated in steps (c) through (f) as a current reference section;

(h) fitting a reference plane equation through measured heights of said current reference section in a region of overlap with another section;

(i) fitting a correction plane equation through measured heights of said other section in said region of overlap;

(j) calculating a difference between said reference and correction plane equations at each pixel of said other section and adding said difference to a corresponding measured height for said pixel such as to produce a corrected height for each pixel of the other section, thereby generating a current composite section of the test surface having a current composite profile comprising said measured heights of the current reference section and said corrected heights of the other section; and (k) repeating steps (h)–(j) to iteratively combine said current composite profile of the test surface generated by a last iteration with a height profile of another section thereof having a region of overlap with said current composite profile; wherein at each iteration said current composite section is treated as the current reference section, and said current composite profile is treated as said measured heights of the current reference section.

10. The method described in claim 9, wherein said matrix has constant r,s dimensions for all of said adjacent sections, and wherein steps (c)–(f) and steps (h)–(k) are carried out by operating on adjacent sections sequentially either by row or by column.

* * * * *